(12) United States Patent
Banks et al.

(10) Patent No.: US 10,533,445 B2
(45) Date of Patent: Jan. 14, 2020

(54) RIM SEAL FOR GAS TURBINE ENGINE

(71) Applicant: United Technologies Corporation, Farmington, CT (US)

(72) Inventors: Anton G. Banks, Manchester, CT (US); Christopher Corcoran, Manchester, CT (US); Bryan P. Dube, Columbia, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 629 days.

(21) Appl. No.: 15/244,203

(22) Filed: Aug. 23, 2016

(65) Prior Publication Data
US 2018/0058236 A1    Mar. 1, 2018

(51) Int. Cl.
*F01D 11/00*  (2006.01)
*F01D 5/02*   (2006.01)
(Continued)

(52) U.S. Cl.
CPC .............. *F01D 11/006* (2013.01); *F01D 5/02* (2013.01); *F01D 5/30* (2013.01); *F02C 3/04* (2013.01);
(Continued)

(58) Field of Classification Search
CPC ...... F01D 11/00; F01D 11/005; F01D 11/006; F01D 5/02; F01D 5/08; F01D 5/088;
(Continued)

(56) References Cited

U.S. PATENT DOCUMENTS 3,112,915 A * 12/1963 Morris ...................... F01D 5/22
                                                             416/193 A
3,709,631 A *  1/1973 Karstensen ............... F01D 5/22
                                                             416/95
(Continued)

FOREIGN PATENT DOCUMENTS

EP    2110515 A2   10/2009
EP    2196623 A1    6/2010
(Continued)

OTHER PUBLICATIONS

European Search Report Issued in EP Application No. 17177520.8, dated Dec. 6, 2017, 9 Pages.

*Primary Examiner* — Jesse S Bogue
(74) *Attorney, Agent, or Firm* — Cantor Colburn LLP

(57) ABSTRACT

A rim seal for a rotor of a gas turbine engine includes a seal portion extending circumferentially across a rim cavity of a rotor, the sealing portion configured to seal the rim cavity and a first foot portion extending radially inwardly from a first end of the sealing portion. A rotor assembly for a gas turbine engine includes a rotor disc and a plurality of rotor blades secured to the rotor disc defining a rim cavity between the rotor disc and a rim portion of the plurality of rotor blades. A rim seal is located in the rim cavity and includes a seal portion extending circumferentially across the rim cavity, the sealing portion configured to seal the rim cavity. The seal portion has an increasing radial thickness with increasing distance from a first end of the rim seal and from a second end opposite the first end.

20 Claims, 2 Drawing Sheets

(51) Int. Cl.
  *F01D 5/30* (2006.01)
  *F02C 3/04* (2006.01)
  *F04D 29/08* (2006.01)
  *F04D 29/32* (2006.01)

(52) U.S. Cl.
  CPC ......... *F04D 29/083* (2013.01); *F04D 29/322* (2013.01); *F05D 2220/323* (2013.01); *F05D 2240/35* (2013.01)

(58) Field of Classification Search
  CPC ...... F01D 5/30; F02C 3/04; F02C 7/28; F04D 29/083; F04D 29/322; F05D 2220/323; F05D 2240/35; Y02T 50/676
  See application file for complete search history.

(56) References Cited

U.S. PATENT DOCUMENTS

| | | | | |
|---|---|---|---|---|
| 3,728,041 | A * | 4/1973 | Bertelson | F01D 9/042 415/189 |
| 3,751,183 | A * | 8/1973 | Nichols | F01D 5/22 416/220 R |
| 4,101,245 | A * | 7/1978 | Hess | F01D 5/22 416/190 |
| 4,516,910 | A * | 5/1985 | Bouiller | F01D 5/22 416/190 |
| 4,743,166 | A * | 5/1988 | Elston, III | F01D 5/3038 416/193 A |
| 4,875,830 | A * | 10/1989 | Trousdell | F01D 5/3038 416/215 |
| 5,156,528 | A * | 10/1992 | Bobo | F01D 5/22 416/190 |
| 5,201,849 | A * | 4/1993 | Chambers | F01D 11/005 416/220 R |
| 5,284,421 | A * | 2/1994 | Chlus | F01D 5/22 416/248 |
| 5,415,526 | A * | 5/1995 | Mercadante | F01D 5/081 416/190 |
| 7,090,224 | B2 * | 8/2006 | Iguchi | F01D 11/005 277/603 |
| 7,374,400 | B2 * | 5/2008 | Boswell | F01D 5/084 416/97 R |
| 9,303,519 | B2 * | 4/2016 | Tarczy | F01D 5/22 |
| 2016/0130977 | A1 | 5/2016 | Snyder et al. | |
| 2016/0222787 | A1 | 8/2016 | Beattie et al. | |

FOREIGN PATENT DOCUMENTS

| | | |
|---|---|---|
| EP | 2208860 A2 | 7/2010 |
| EP | 2639409 A2 | 9/2013 |
| WO | 2015112226 A2 | 8/2015 |

\* cited by examiner

RIM SEAL FOR GAS TURBINE ENGINE

FEDERAL RESEARCH STATEMENT

This invention was made with Government support under contract FA8650-09-D-2923-0021 awarded by U.S. Air Force. The Government has certain rights in the invention.

BACKGROUND

The present disclosure relates to gas turbine engines, and more particularly to turbine seals for gas turbine engines.

A typical gas turbine engine includes a turbine section having one or more turbine rotor stages. The rotor stage includes a rotor disc with a plurality of rotor blades secured to the rotor disc. The rotor blades typically abut circumferentially when installed to the rotor disc. A rim seal is installed across the abutment of the rotor blades to prevent hot gas path flow from leaking from the gas path between the rotor blades, thus preventing losses of operating performance of the turbine section. Further, the rim seal protects the rotor disc from damage due to exposure to the hot gas path flow.

The rim seal is typically located radially in a cavity between a rotor disc end and a blade platform of the rotor blade. In some conditions, the rotor blades, which are typically formed by casting, are formed with scant material in the platform area. This lessens an amount of bearing contact area between the blade platform area and the rim seal, thus reducing a capability of the rim seal to be retained in the cavity.

SUMMARY

In one embodiment, a rim seal for a rotor of a gas turbine engine includes a seal portion extending circumferentially across a rim cavity of a rotor, the sealing portion configured to seal the rim cavity and a first foot portion extending radially inwardly from a first end of the sealing portion.

Additionally or alternatively, in this or other embodiments a second foot portion extends radially inwardly from a second end of the sealing portion opposite the first end.

Additionally or alternatively, in this or other embodiments the seal portion has an increasing radial thickness with increasing distance from the first end and from a second end opposite the first end.

Additionally or alternatively, in this or other embodiments the seal portion includes a seal surface configured to abut a rim portion of the plurality of rotor blades.

Additionally or alternatively, in this or other embodiments the seal surface has a cross-sectional shape matching a cross-sectional shape of the rim portion.

In another embodiment, a rotor assembly for a gas turbine engine includes a rotor disc and a plurality of rotor blades secured to the rotor disc defining a rim cavity between the rotor disc and a rim portion of the plurality of rotor blades. A rim seal is located in the rim cavity and includes a seal portion extending circumferentially across the rim cavity, the sealing portion configured to seal the rim cavity. The seal portion has an increasing radial thickness with increasing distance from a first end of the rim seal and from a second end opposite the first end.

Additionally or alternatively, in this or other embodiments a first foot portion extends radially inwardly from the first end of the rim seal.

Additionally or alternatively, in this or other embodiments a second foot portion extends radially inwardly from the second end of the rim seal opposite the first end.

Additionally or alternatively, in this or other embodiments the seal portion includes a seal surface configured to abut the rim portion.

Additionally or alternatively, in this or other embodiments the seal surface has a cross-sectional shape matching a cross-sectional shape of the rim portion.

Additionally or alternatively, in this or other embodiments the rim cavity is defined between circumferentially adjacent rotor blades of the plurality of rotor blades.

Additionally or alternatively, in this or other embodiments the rim seal prevents leakage through a circumferential gap between the circumferentially adjacent rim portions.

Additionally or alternatively, in this or other embodiments the rotor assembly is a turbine rotor assembly.

In yet another embodiment, a gas turbine engine includes a combustor and a turbine located downstream of the combustor. The turbine includes a rotor assembly having a rotor disc and a plurality of rotor blades secured to the rotor disc defining a rim cavity between the rotor disc and a rim portion of the plurality of rotor blades. A rim seal is located in the rim cavity and includes a seal portion extending circumferentially across the rim cavity, the sealing portion configured to seal the rim cavity and a first foot portion extending radially inwardly from a first end of the sealing portion.

Additionally or alternatively, in this or other embodiments a second foot portion extendsradially inwardly from a second end of the sealing portion opposite the first end.

Additionally or alternatively, in this or other embodiments the seal portion has an increasing radial thickness with increasing distance from the first end and from a second end opposite the first end.

Additionally or alternatively, in this or other embodiments the seal portion includes a seal surface configured to abut the rim portion.

Additionally or alternatively, in this or other embodiments the seal surface has a cross-sectional shape matching a cross-sectional shape of the rim portion.

Additionally or alternatively, in this or other embodiments the rim cavity is defined between circumferentially adjacent rotor blades of the plurality of rotor blades.

Additionally or alternatively, in this or other embodiments the rim seal prevents leakage through a circumferential gap between the circumferentially adjacent rim portions.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
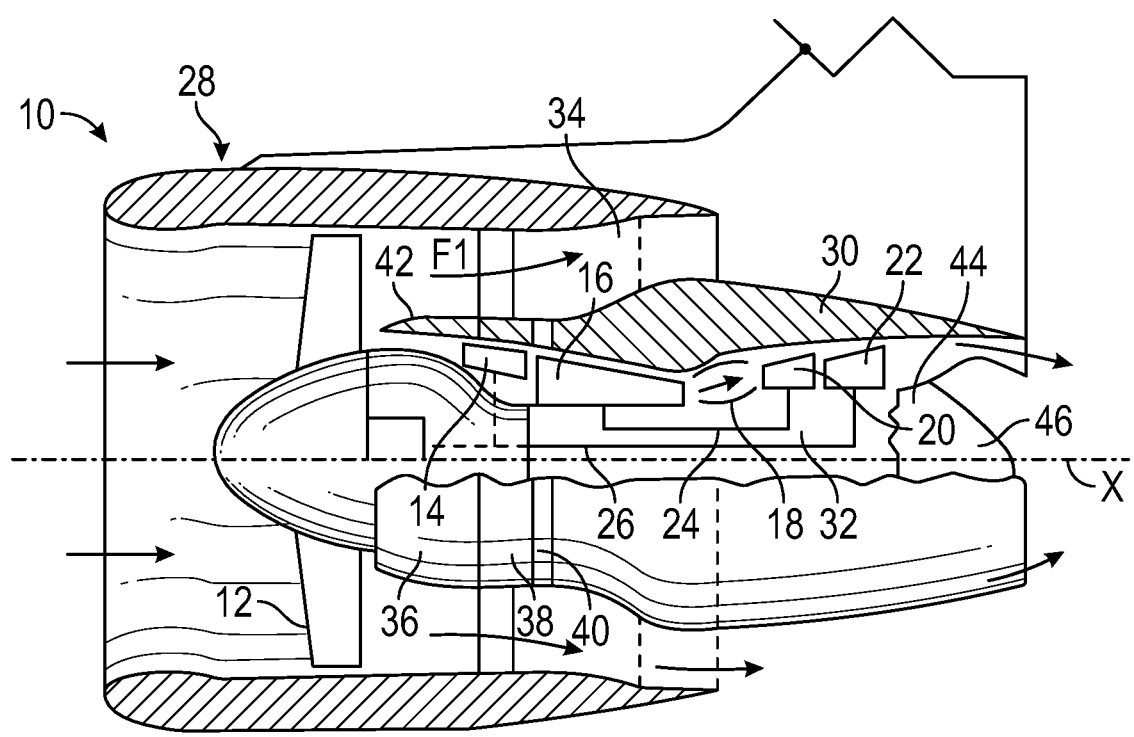
FIG. 1 is a cross-sectional view of an embodiment of a gas turbine engine.

FIG. 1 is a schematic illustration of a gas turbine engine 10. The gas turbine engine generally has includes fan section 12, a low pressure compressor 14, a high pressure compressor 16, a combustor 18, a high pressure turbine 20 and a low pressure turbine 22. The gas turbine engine 10 is circumferentially disposed about an engine centerline X. During operation, air is pulled into the gas turbine engine 10 by the fan section 12, pressurized by the compressors 14, 16, mixed with fuel and burned in the combustor 18. Hot combustion gases generated within the combustor 18 flow through high and low pressure turbines 20, 22, which extract energy from the hot combustion gases.

In a two-spool configuration, the high pressure turbine 20 utilizes the extracted energy from the hot combustion gases to power the high pressure compressor 16 through a high speed shaft 24, and the low pressure turbine 22 utilizes the energy extracted from the hot combustion gases to power the low pressure compressor 14 and the fan section 12 through a low speed shaft 26. The present disclosure, however, is not limited to the two-spool configuration described and may be utilized with other configurations, such as single-spool or three-spool configurations, or gear-driven fan configurations.

Gas turbine engine 10 is in the form of a high bypass ratio turbine engine mounted within a nacelle or fan casing 28 which surrounds an engine casing 30 housing an engine core 32. A significant amount of air pressurized by the fan section 12 bypasses the engine core 32 for the generation of propulsive thrust. The airflow entering the fan section 12 may bypass the engine core 32 via a fan bypass passage 34 extending between the fan casing 28 and the engine casing 30 for receiving and communicating a discharge flow F1. The high bypass flow arrangement provides a significant amount of thrust for powering an aircraft.

The engine casing 30 generally includes an inlet case 36, a low pressure compressor case 38, and an intermediate case 40. The inlet case 36 guides air to the low pressure compressor case 38, and via a splitter 42 also directs air through the fan bypass passage 34. The engine casing 30 further includes a turbine exhaust case 44 with a tail cone 46 affixed thereto.

Figure 2:
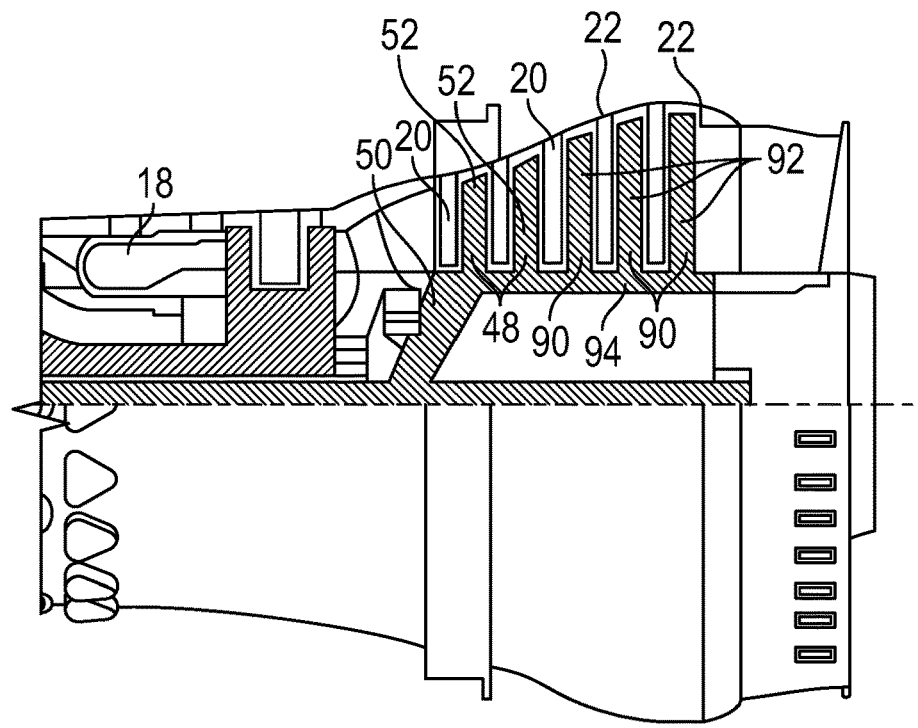
FIG. 2 is a cross-sectional view of an embodiment of a turbine section of a gas turbine engine.

Referring now to FIG. 2, the high pressure turbine 20 includes one or more high pressure turbine rotors 48 each connected to the high speed shaft 24 and rotatable therewith. The high pressure turbine rotor 48 includes a high pressure turbine rotor disc 50 connected to the high speed shaft 24 and a plurality of high pressure turbine blades 52 extending radially outwardly from the rotor disc 50. Similarly, low pressure turbine 22 includes one or more low pressure turbine rotors 90 connected to the low speed shaft 26. Each low pressure turbine rotor 90 includes a plurality of low pressure turbine blades 92 extending from a low pressure turbine rotor disc 94.

Figure 3:
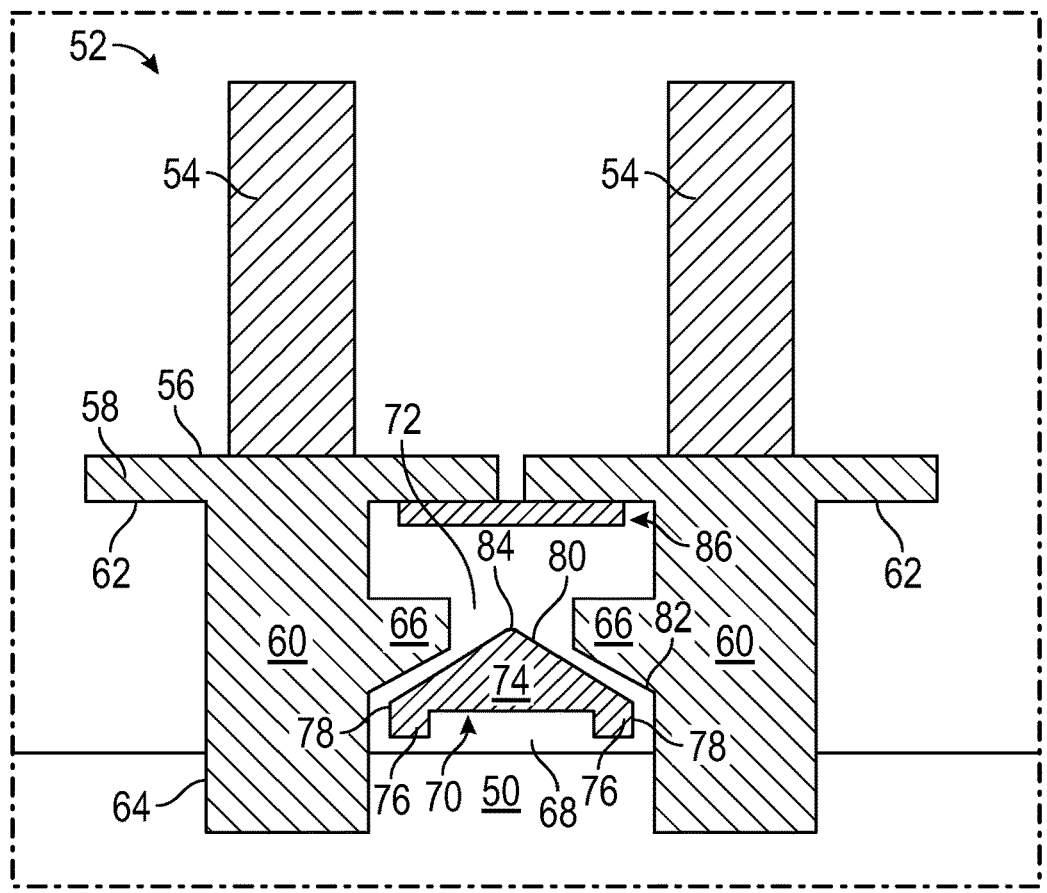
FIG. 3 is a cross-sectional view of a rotor assembly for a gas turbine engine.

Referring to FIG. 3, the following description is in the context of a high pressure turbine rotor 48, but one skilled in the art will readily appreciate that the disclosure herein may readily be applied to low pressure turbine rotors 90. Further, the configurations disclosed herein may be readily applied to other rotor assemblies, such as those of the low pressure compressor 14 and/or the high pressure compressor 16.

The low pressure turbine blades 52 include an airfoil portion 54 extending from a flow path side 56 of a blade platform 58 and further include a retention portion 60 extending from a non-flow path side 62 of the blade platform 58. The retention portion 60 is inserted into a retaining portion 64 of the low pressure turbine rotor disc 50 to secure the low pressure turbine blades 52 at the low pressure turbine rotor disc 50. Radially inboard of the blade platform 58, the low pressure turbine blades 52 include rim portions 66, defining a dead rim cavity 68 radially inboard of the rim portion 66 and between the rim portion 66 and the low pressure turbine rotor disc 50. Installation of the low pressure turbine blades 52 to the low pressure turbine rotor disc 50 leaves a potential leakage path of flowpath gases between adjacent rim portions 66 and between adjacent blade platforms 58 potentially damaging the low pressure turbine rotor disc 50 and reducing performance of the turbine. Similarly, cooling flow from the dead rim cavity 68 may leak radially outwardly from the dead rim cavity 68. To prevent such leakages, a rim seal 70 is located in the dead rim cavity 68 and extends across the adjacent rim portions 66 a rim opening 72 therebetween.

The rim seal 70 includes a seal portion 74 extending circumferentially across the dead rim cavity 68 and further includes a foot portion 76 extending radially inwardly from each seal end 78 of the seal portion 74. The seal portion 74 includes a seal surface 80, which in some embodiments has a shape matching that of a non-flow path side 82 of the rim portion 66 to provide sealing of the rim opening 72. In some embodiments, a radial thickness of the seal portion 74 increases from the seal ends 78 to a seal peak 84 located midway between the seal ends 78. Such an increase in thickness of the seal portion 74 reduces bending stresses on the rim seal 70, compared to a rim seal having a constant thickness.

The foot portion 76 located at each seal end 78 extends radially inwardly from the seal portion 74 toward the low pressure turbine rotor disc 50 across the dead rim cavity 68. The foot portion 76 provides a standoff defining the dead rim cavity 68 between the rim seal 70 and the low pressure turbine rotor disc 50, to allow cooling airflow to circulate in the dead rim cavity 68. Further, the foot portion 76 prevents improper installation of the rim seal 70. If, for example, it was attempted to install the rim seal 70 with the foot portion 76 extending radially outwardly rather than radially inwardly, the foot portion 76 would interfere with the rim portion 66

Additionally, in some embodiments, a blade vibration damper 86 is located at the non-flow path side 62 of the blade platform 58 and may span a gap between adjacent blade platforms 58 to dampen vibration of the low pressure turbine blades 52 during operation of the gas turbine engine 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A rim seal for a rotor of a gas turbine engine, the rotor including a rotor disc, a plurality of rotor blades secured to the rotor disc each including a blade platform with a blade platform top and a blade platform bottom, a retention portion extending radially inboard from the blade platform, and a rim portion extending circumferentially from the retention portion spaced inboard from the blade platform bottom, adjacent rim portions defining a rim cavity between the rim portions and the rotor disc, the seal comprising:
a seal portion extending circumferentially across the rim cavity, the sealing portion configured to seal the rim cavity, the seal portion extending radially outwardly to a seal peak disposed in the rim cavity and midway between a first circumferential seal end and a second circumferential seal end; and
a first foot portion extending radially inwardly from the first circumferential seal end of the sealing portion.

2. The rim seal of claim 1, further comprising a second foot portion extending radially inwardly from the second circumferential seal end of the sealing portion opposite the first circumferential seal end.

3. The rim seal of claim 1, wherein the seal portion has an increasing radial thickness with increasing distance from a circumferentially inboard end of the first foot.

4. The rim seal of claim 1, wherein the seal portion includes a seal surface configured to abut the rim portion of the plurality of rotor blades.

5. The rim seal of claim 4, wherein the seal surface has a cross-sectional shape such that a portion of the seal surface cross-sectional shape matches a cross-sectional shape of the rim portion.

6. A rotor assembly for a gas turbine engine comprising:
a rotor disc;
a plurality of rotor blades secured to the rotor disc each rotor blade including:
a blade platform with a blade platform top and a blade platform bottom;
a retention portion extending radially inboard from the blade platform; and
a rim portion extending circumferentially from the retention portion spaced inboard from the blade platform bottom, adjacent rim portions defining a rim cavity between the rotor disc and the rim portions; and
a rim seal disposed in the rim cavity including a seal portion extending circumferentially across the rim cavity, the sealing portion configured to seal the rim cavity;
wherein the seal portion has an increasing radial thickness with increasing distance from a first circumferential seal end of the rim seal and from a second circumferential seal end opposite the first end, the seal portion extending radially outwardly to a seal peak disposed in the rim cavity and midway between the first circumferential seal end and the second circumferential seal end.

7. The rotor assembly of claim 6, further comprising a first foot portion extending radially inwardly from the first circumferential seal end of the rim seal, the seal portion having an increasing radial thickness with increasing distance from a circumferentially inboard end of the first foot.

8. The rotor assembly of claim 7, further comprising a second foot portion extending radially inwardly from the second circumferential seal end of the rim seal opposite the first circumferential seal end.

9. The rotor assembly of claim 6, wherein the seal portion includes a seal surface configured to abut the rim portion.

10. The rotor assembly of claim 9, wherein the seal surface has a cross-sectional shape such that a portion of the seal surface cross-sectional shape matches a cross-sectional shape of the rim portion.

11. The rotor assembly of claim 6, wherein the rim cavity is defined between circumferentially adjacent rotor blades of the plurality of rotor blades.

12. The rotor assembly of claim 11, wherein the rim seal prevents leakage through a circumferential gap between the circumferentially adjacent rim portions.

13. The rotor assembly of claim 6, wherein the rotor assembly is a turbine rotor assembly.

14. A gas turbine engine comprising:
a combustor; and
a rotor assembly in fluid communication with the combustor including:
a rotor disc;
a plurality of rotor blades secured to the rotor disc each rotor blade including:
a blade platform with a blade platform top and a blade platform bottom;
a retention portion extending radially inboard from the blade platform; and
a rim portion extending circumferentially from the retention portion spaced inboard from the blade platform bottom, adjacent rim portions defining a rim cavity between the rotor disc and the rim portions; and
a rim seal disposed in the rim cavity including:
a seal portion extending circumferentially across the rim cavity, the sealing portion configured to seal the rim cavity, the seal portion extending radially outwardly to a seal peak disposed in the rim cavity and midway between a first circumferential seal end and a second circumferential seal end; and
a first foot portion extending radially inwardly from the first circumferential seal end of the sealing portion.

15. The gas turbine engine of claim 14, further comprising a second foot portion extending radially inwardly from the second circumferential seal end of the sealing portion opposite the first end.

16. The gas turbine engine of claim 14, wherein the seal portion has an increasing radial thickness with increasing distance a circumferentially inboard end of the first foot.

17. The gas turbine engine of claim 14, wherein the seal portion includes a seal surface configured to abut the rim portion.

18. The gas turbine engine of claim 17, wherein the seal surface has a cross-sectional shape such that a portion of the seal surface cross-sectional shape matches a cross-sectional shape of the rim portion.

19. The gas turbine engine of claim 14, wherein the rim cavity is defined between circumferentially adjacent rotor blades of the plurality of rotor blades.

20. The gas turbine engine of claim 19, wherein the rim seal prevents leakage through a circumferential gap between the circumferentially adjacent rim portions.

* * * * *